April 19, 1960     J. M. SLATER ET AL     2,933,267

GYROSCOPICALLY STABILIZED NAVIGATIONAL REFERENCE DEVICE

Filed July 19, 1954     7 Sheets-Sheet 1

*INVENTORS.*
JOHN M. SLATER
BY ROBERT M. BENSON
VERNON A. TAUSCHER

*William R. Lane*
ATTORNEY

April 19, 1960     J. M. SLATER ET AL     2,933,267
GYROSCOPICALLY STABILIZED NAVIGATIONAL REFERENCE DEVICE
Filed July 19, 1954     7 Sheets-Sheet 3

*INVENTORS.*
JOHN M. SLATER
BY ROBERT M. BENSON
VERNON A. TAUSCHER

ATTORNEY

INVENTORS.
JOHN M. SLATER
BY ROBERT M. BENSON
VERNON A. TAUSCHER

William R. Lane
ATTORNEY

April 19, 1960   J. M. SLATER ET AL   2,933,267
GYROSCOPICALLY STABILIZED NAVIGATIONAL REFERENCE DEVICE
Filed July 19, 1954   7 Sheets-Sheet 5

INVENTORS.
JOHN M. SLATER
BY ROBERT M. BENSON
   VERNON A. TAUSCHER

*William R. Lane*
ATTORNEY

April 19, 1960     J. M. SLATER ET AL     2,933,267
GYROSCOPICALLY STABILIZED NAVIGATIONAL REFERENCE DEVICE
Filed July 19, 1954     7 Sheets-Sheet 6

*INVENTORS.*
JOHN M. SLATER
BY ROBERT M. BENSON
VERNON A. TAUSCHER

*William R. Lane*
ATTORNEY

April 19, 1960  J. M. SLATER ET AL  2,933,267
GYROSCOPICALLY STABILIZED NAVIGATIONAL REFERENCE DEVICE
Filed July 19, 1954  7 Sheets-Sheet 7

INVENTORS.
JOHN M. SLATER
BY ROBERT M. BENSON
VERNON A. TAUSCHER
ATTORNEY

United States Patent Office 2,933,267
Patented Apr. 19, 1960

2,933,267

GYROSCOPICALLY STABILIZED NAVIGATIONAL REFERENCE DEVICE

John M. Slater, Fullerton, Robert M. Benson, Pacific Palisades, and Vernon A. Tauscher, Los Angeles, Calif., assignors to North American Aviation, Inc.

Application July 19, 1954, Serial No. 444,116

25 Claims. (Cl. 244—14)

This invention pertains to apparatus which is a navigational reference device adapted to guide the motion of a body from one point to another. The device of this invention is particularly adapted to control the motion of a body along a predetermined path over the surface of the earth without contact or connection with the body after motion has begun.

This application is a continuation in part of application Serial No. 81,374 filed March 14, 1949 in the names of J. M. Slater, R. M. Benson and V. A. Tauscher (now abandoned).

This invention is used primarily to navigate an aircraft or other vehicle over a predetermined path. In the following description, a plane which passes through the center of the earth and includes the starting or launching point of the craft and includes the destination point of the craft will be denoted the guidance plane.

If the projection upon the guidance plane of the route chosen is a great circle of the earth, the entire path of the craft can be considered a great circle of the earth. The device contemplated by this invention measures the acceleration of a moving body in the direction of travel and normal thereto. The measured accelerations are integrated twice with respect to time to obtain a measure of the distance travelled in each of the directions in which acceleration is measured. The measured accelerations are integrated once with respect to time to obtain a measure of the velocity of the craft in each of the directions of which acceleration is measured. The distance measured in the direction of travel along a great circle in the guidance plane is proportional to the central angle subtended by the arc thereof. Similarly, the instantaneous velocity in the direction of the great circle is proportional to the instantaneous angular velocity of a line connecting the platform and the center of the earth.

None of the known accelerometers or acceleration sensitive devices is capable of distinguishing between acceleration due to gravity and acceleration which is caused by increased or decreased velocity. The device contemplated by this invention provides means for holding the accelerometers so that their sensitive or acceleration measuring axes are at all times normal to a line joining them and the center of the earth.

The device contemplated by this invention comprises a platform upon which are mounted three gyroscopes with their input or torque axes disposed normal to each other. This platform tends to maintain itself in a fixed angular attitude with respect to space. The platform contemplated by this invention is mechanically constructed to have three degrees of rotational freedom with respect to its supporting craft. If nothing further were provided, the platform would be observed to make one complete revolution with respect to the earth in each 24-hour period. Such a simple platform would not serve the desired purpose of keeping the accelerometers level.

In the device contemplated by this invention, each gyroscope is free to precess about one axis orthogonal to the plane of its input or torque axis and its spin axis. In a gyroscope, the torque axis and the precession axis are normally interchangeable, i.e. if a torque is placed about one axis a precession follows about the other axis. In the following description, "input" and "output" axes are used to describe the two non-spin axes of the gyroscope. In the device of this invention, a torque is applied about the output axis of each gyroscope which is just sufficient in magnitude to cause each gyroscope to precess about its input axis at the same angular rate as that component of the earth's spin velocity which is parallel to the input axis of that particular gyroscope. The precession velocities caused by the torques applied about the output axis of the gyroscopes add vectorially, just as the three components of the earth's spin velocity do, to cause the platform to rotate about an axis parallel to the earth's axis and in synchronism with the earth. Hence, although the platform rotates at a constant rate with respect to inertial space, it remains angularly motionless with respect to the earth. The device thus far described can be used to keep the accelerometers level with the earth, provided the device was kept stationary at some particular location on the earth's surface.

Since the accelerometers must be moved over the earth's surface to be of use, and since the earth has a curved surface, the device contemplated by this invention further provides means to assure that the accelerometers are maintained level, not with respect to the starting point only, but with respect to the instantaneous position of the accelerometers on the earth's surface. The accelerometers' outputs are doubly integrated to yield the distance traveled over the earth. One accelerometer is mounted to measure acceleration in the guidance plane whereby its doubly integrated acceleration at any instant, corrected if necessary for changes in altitude and Coriolis, is a measure of the distance traveled from the point of start to that particular point. The device of this invention is arranged to mount the accelerometers to be free to rotate with respect to the gyroscopically stabilized platform about an axis generally normal to the guidance plane. The accelerometer support device or accelerometer platform is then driven forward in space through an angle at an angular rate such that its angular velocity is proportional to the instantaneous velocity of the craft in the direction of its flight. The accelerometer platform has then turned through an angle proportional to the distance from the starting point of the craft. The scale factor is adjusted so that the accelerometer platform maintains the accelerometers' sensitive axes perpendicular to a line drawn between the platform and the center of the earth. In this invention, the accelerometers and accelerometer platform are trunnion-connected to the gyroscopically stabilized platform. The axis of the trunnion is perpendicular to the guidance plane.

The gyroscopically stabilized frame or platform of this invention must be initially aligned prior to launching of the supporting aircraft. The means for initially aligning the reference device of this invention not only points the platform thereof relative to the initial direction of travel of the supporting vehicle, but also generates the above-mentioned permanent torques about the output axes of the gyroscopes to cause the gyroscopically stabilized platform to rotate about an axis parallel to the polar axis of the earth at the same angular velocity as the angular velocity of the earth. Hence, the gyroscopically stabilized platform is maintained "at launching point level."

Reference is made to copending application Serial No. 72,524, filed January 24, 1949, in the name of John M. Slater et al., now U.S. Patent No. 2,649,808, which discloses a particular gyroscope that can be used in the guidance system more particularly described and claimed in this application.

Reference is further made to copending application Serial No. 57,816, filed November 1, 1948, in the name of S. F. Eyestone et al., which discloses a particular accelerometer that can be used in the guidance system of this invention.

It is therefore an object of this invention to provide navigational reference means adapted for navigating a body over long distances.

It is another object of this invention to provide navigational reference means which is independent of external control and adapted to supply information for navigating a body along a predetermined path.

It is another object of this invention to provide navigational reference means which provides signal information adapted to control an autopilot, missile or aircraft with great precision from one point on the earth's surface to another.

It is still another object of this invention to provide a navigational reference device in which one stabilized element rotates in synchronism with the earth with uniform angular velocity about an axis parallel to the earth's polar axis.

It is another object of this invention to provide a navigational reference device having high inherent accuracy.

It is still another object of this invention to provide means which are substantially free of reaction torques for supporting a stable element.

It is yet another object of this invention to provide means for supporting acceleration-sensitive devices in level attitude during motion of the system over the surface of the earth.

It is another object of this invention to provide a navigational reference device adapted for automatically navigating an aircraft along a great circle route between two points upon the surface of the earth.

It is yet another object of this invention to provide a launching point-leveled, gyroscopically-stabilized platform.

It is another object of this invention to provide means for maintaining an acceleration-sensitive device horizontal upon a vehicle when said vehicle is stationary and when it is moving over the surface of the earth.

It is yet another object of this invention to provide a gyroscopically-controlled stabilized element which is maintained angularly stationary relative to its launching point, in combination with means having one degree of freedom relative to said stabilized element about an axis perpendicular to the direction of flight of a supporting vehicle for supporting accelerometer means locally horizontal at all positions along the path of flight.

Other objects of invention will become apparent from the following description taken in connection with the accompanying drawings, in which Fig. 1 is a view of the stabilized element of this invention;

Figure 19:
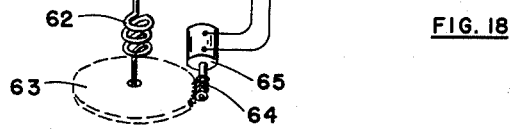
Figure 19:
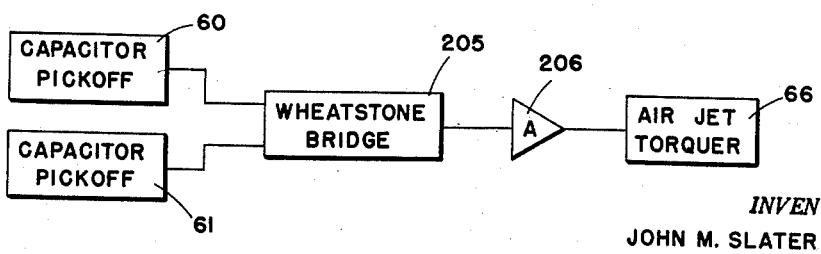

And Fig. 19 is a block diagram of the electrical connection between the gyroscope precession detectors or pickoffs and the airjet torquers attached to the frame of the device.

Figure 12:
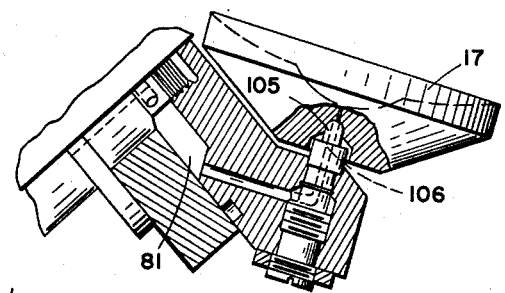
Fig. 12 is a view taken at 12—12 in Fig. 4.

Gyroscopically stabilized platform 1 is supported for three degrees of angular freedom relative to the frame of its supporting aircraft or other vehicle 2. Three gyroscopes 4, 5 and 6 are attached to frame 3 with their input axes orthogonal. Ball mount 7 is rigidly attached and centrally positioned within frame 3. Ball mount 7 may be, for example, of quartz. Accelerometer platform 8 is trunnion mounted upon trunnion 9 relative to frame 3. The axis of trunnion 9 is perpendicular to the direction of travel of vehicle 2 as described hereinafter. Two accelerometers 10 and 11 are rigidly attached to and maintained horizontal by accelerometer platform 8. The entire gyroscopically stabilized assembly 1 is preferably statically balanced about the center of spherical ball 7. Spherical ball 7, and hence stabilized element 1, is frictionlessly supported by means of eight supporting air pads 12, 13, 14, 15, 16, 17, 18 and 19, the details of which are shown in Fig. 12 and described hereinafter.

Air pads 12, 13, 14, 15, 16, 17, 18 and 19 are supported upon swivels shown in Fig. 12 and described more particularly hereinafter and are supportingly attached to yoke or gimbal 20. Yoke or gimbal 20 is rotatingly supported by means of upstanding members 21 and 22 and cross arm 23.

Figure 6:
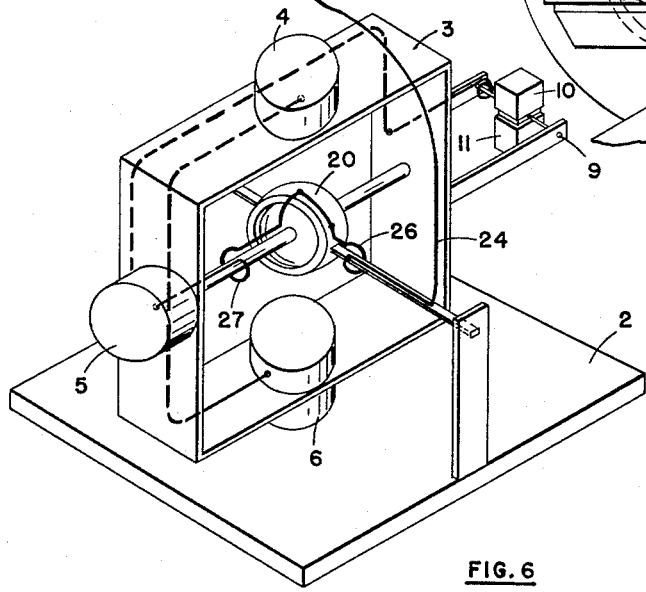
Fig. 6 is a schematic diagram of the platform of this invention which shows the electrical cabling thereof.

Electrical wiring is carried by means of cables as shown by heavy line 24 in Fig. 6. Fig. 6 is a schematic drawing of the device of this invention especially drawn to show the electrical cabling thereof. Notice that the cable is freely looped at 25, 26 and 27 in order to allow freedom of rotation of the relative parts at those points.

Figure 7:
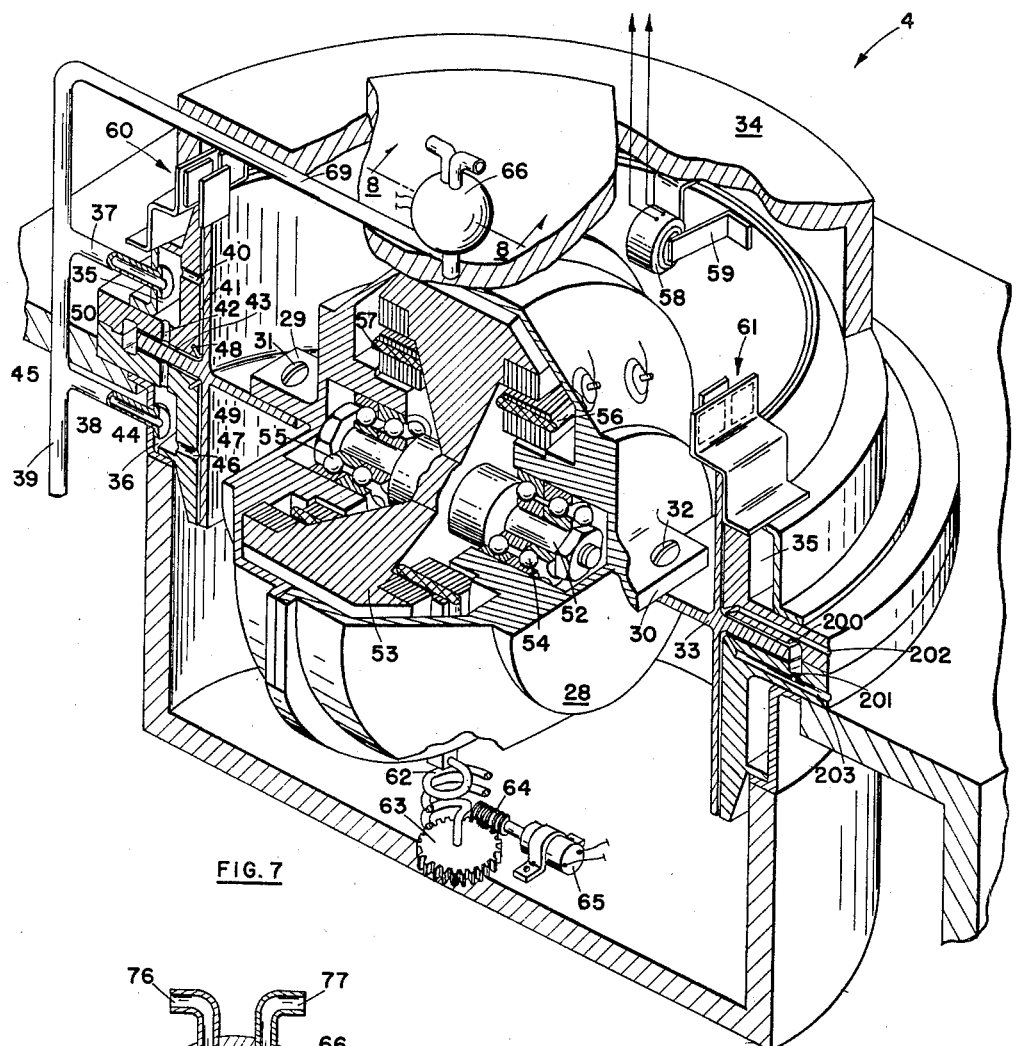
Fig. 7 is a view, partly in section, of a gyroscope adapted to be used in this invention.

One of gyroscopes 4, 5 and 6, namely gyroscope 4, is shown in detail in Fig. 7. In Fig. 7 gyroscope housing 28 is mounted by means of ears 29 and 30 and screws 31 and 32 upon floating element 33. Floating element 33 is adapted to be supported relative to external gyroscope housing 34 upon a cushion of air. Air is introduced into channels 35 and 36 through conduits 37 and 38, respectively. The air in conduits 37 and 38 is received through conduit 39. The air in conduit 35 passes through a plurality of orifices uniformly spaced about the circumference of channel 35 of which one said orifice 40 is shown. The orifices, of which orifice 40 is one, conduct air to air bearing surface 41. A plurality of orifices, of which orifice 42 is one, are uniformly spaced about the circumference of channel 35 to conduct air to air bearing surface 43. Similarly a plurality of orifices, of which orifice 44 is one, conducts air between channel 36 and air bearing surface 45, while a plurality of orifices, of which orifice 46 is one, conducts air between channel 36 and air bearing surface 47. The orifices, of which 44 and 46 are each one, are uniformly spaced circumferentially about channel 36. Channels 48, 49 and 50 scavenge the air from air bearing surfaces 41, 43, 45 and 47 which then exhausts through orifices 200, 201, 202 and 203 to the outside air. Hence, structure 33 and housing 28 are supported upon an air bearing rotatable about an axis which is perpendicular to the axis of shaft 52 of rotor 53 of gyroscope 4. Rotor 53 is supported upon shaft 52, hence upon bearings 54 and 55 relative to housing 28. Rotor 53 is adapted to be driven by means of motor windings 56 and 57. Electrical coil 58 and armature 59 are adapted, when electrical current is applied to coil 58, to place a torque upon element 33 about its axis of rotation. Capacitance pickoffs 60 and 61 are adapted to detect motion of element 33 about its axis of rotation, as described more particularly in connection with Fig. 19. Spring 62, gear 63, worm 64 and motor 65 are adapted to mechanically place a torque upon element 33 about its axis of rotation as described more fully in connection with Fig. 18.

Figure 1:
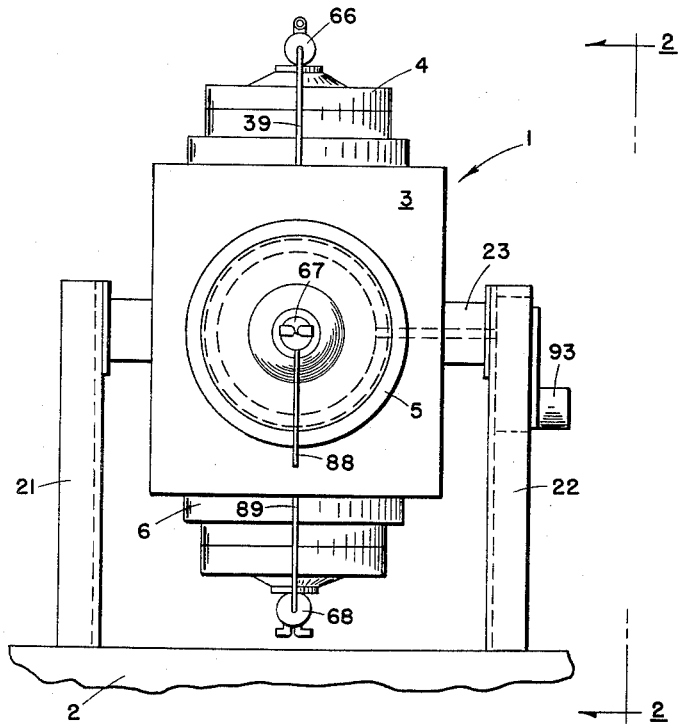
Figure 8:
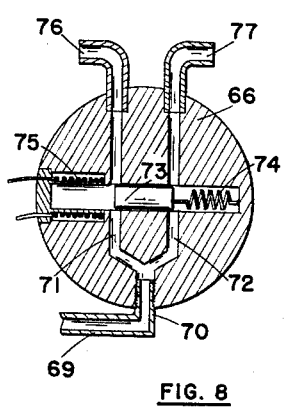
Fig. 8 is a view, partly in section, of a typical airjet torquer adapted to be used in this invention.
Figure 9:
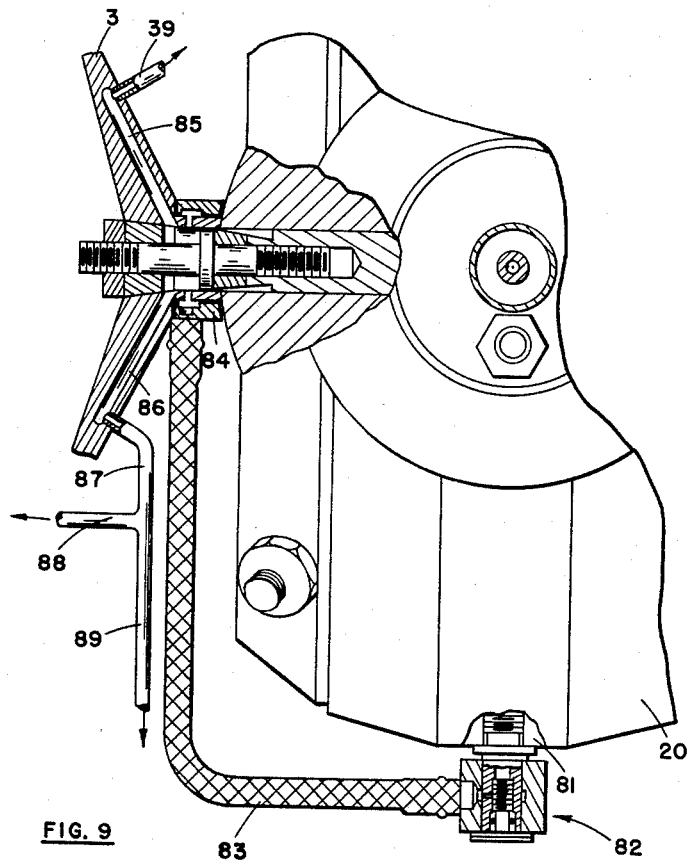
Fig. 9 is a view, partly in section, of air-hose connections in this invention.

An airjet torquer is positioned upon the outer housing of gyroscope 4 adapted to apply torques to frame 3. Air is carried to airjet torquer 66 through conduit 69. Other airjet torquers 67 and 68 are shown more particularly in Figs. 1 and 2 and are adapted to generate torques about the other two mutually perpendicular axes of frame 3. Internal details of airjet torquer 66 are shown in Fig. 8. Air entering through conduit 69 passes into conduit 70 and into conduits 71 and 72. Armature 73 partially closes conduits 71 and 72 when no torque is to be applied by torquer 66. Armature 73 is held to the right by means of spring 74 and is pulled to the left by means of electrical current flowing in coil 75. Air passes through conduits 71 and 72 and is ejected into the atmosphere in opposite directions as shown at ports 76 and 77. When the current applied to coil 75 is increased, armature 73 moves to the left to allow more air to flow from port 77 and less from port 76. When the current applied to coil 75 is decreased, armature 73 moves to the right to allow more air to flow from port 76 and less from port 77.

As shown in Fig. 19, precession of a gyroscope such as gyroscope 4 excites capacitor pickoffs 60 and 61. Pickoffs 60 and 61 are connected to the input of Wheatstone bridge 205. The output of Wheatstone bridge 205 is connected through amplifier 206 to control the action of airjet torquer 66. Hence, when a component of torque is applied to frame 3 about an axis perpendicular to the plane of Fig. 2, gyroscope 4 precesses and excites pickoffs 60 and 61 which cause airjet torquer to apply a torque to frame 3 which counters the disturbing torque.

Air is carried from a supply (not shown) upon supporting vehicle 2 onto frame 3 by means of conduit 78, thence through conduit 79 and through conduit 80 into channel 81 within gimbal or yoke 20. Air is carried from channel 81 within gimbal or yoke 20 by means of air swivel 82, flexible conduit 83 and air swivel 84. Air is then carried to gyroscope 4 through conduits 85 and 39. Air is carried to gyroscope 5 through conduits 86, 87 and 88, and to gyroscope 6 through conduits 86, 87 and 89.

Figure 10:
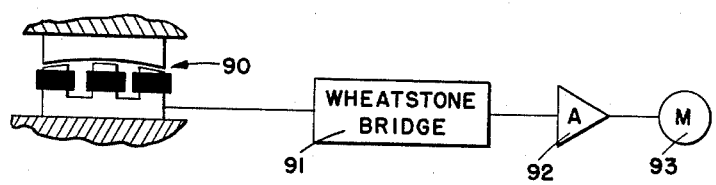
Fig. 10 is a view, partly in section, of the pitch axis pickoff, together with a block diagram of typical electrical connections attached thereto.

Pickoff 90, shown more particularly in Fig. 10, is positioned on top of yoke 20 to measure the movement of frame 3 relative to yoke 20 about an axis passing through the center of ball mount 7 parallel to cross-arm 23. This axis is sometimes hereinafter designated as a pitch axis. The output of pickoff 90 is connected through Wheatstone bridge 91 and amplifier 92 to motor 93, as shown in Fig. 10. Any unbalance of pickoff 90 causes motor 93 to rotate. Motor 93 is mechanically connected through gear train 94 and shaft 95 to turn yoke 20 to rebalance pickoff 90.

Figure 2:
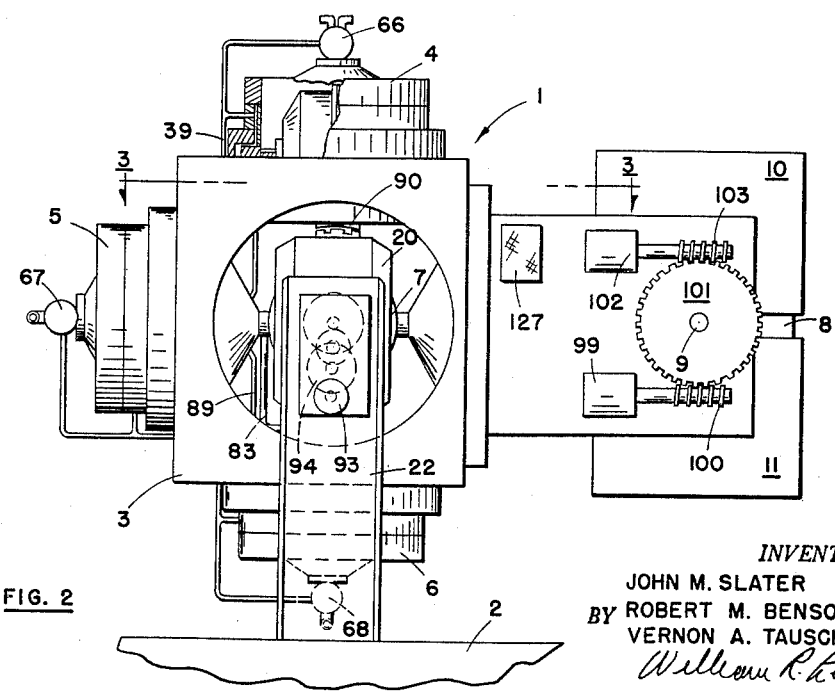
Fig. 2 is a view partly in section taken from the right in Fig. 1.
Figure 3:
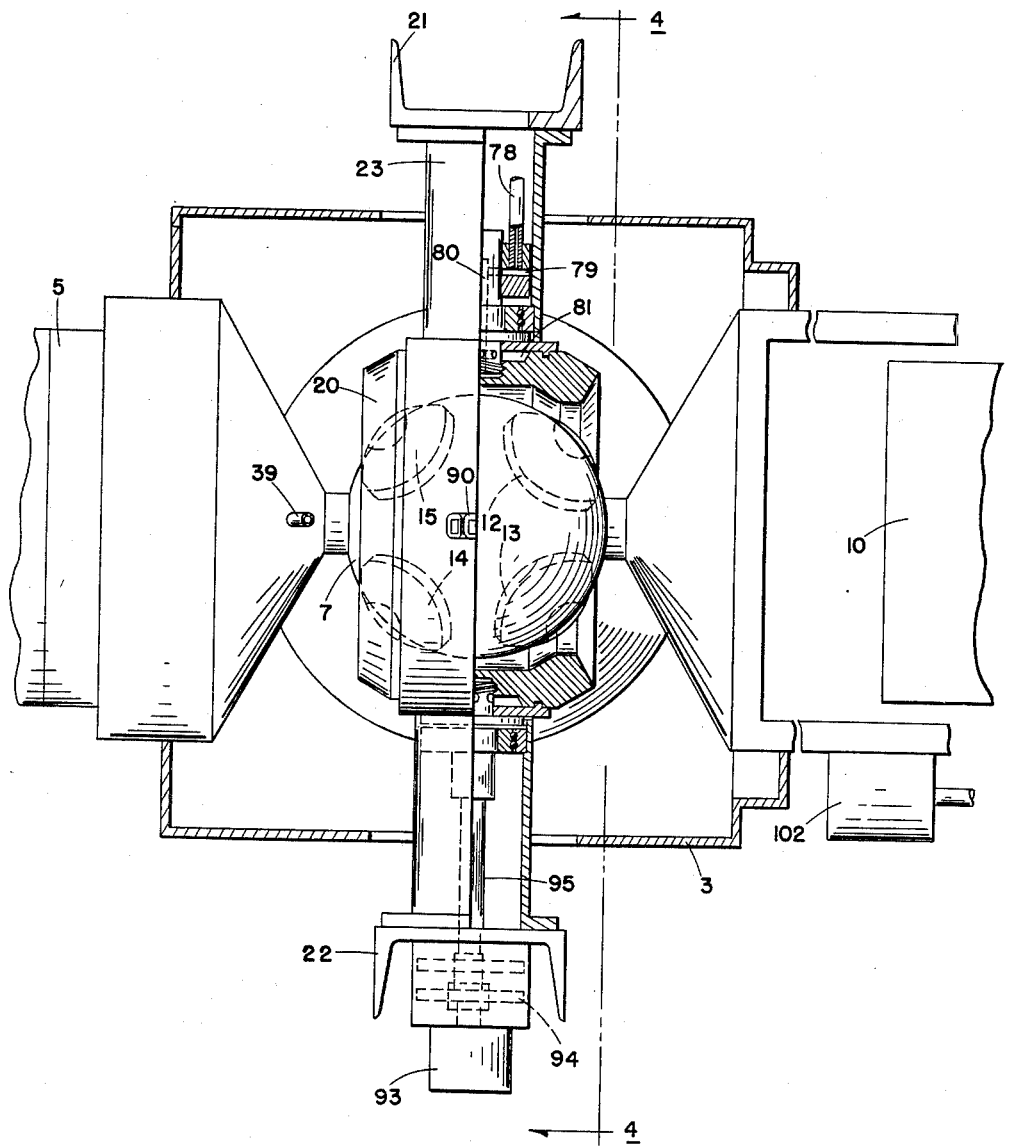
Fig. 3 is a view partly in section taken at 3—3 in Fig. 2.
Figure 4:
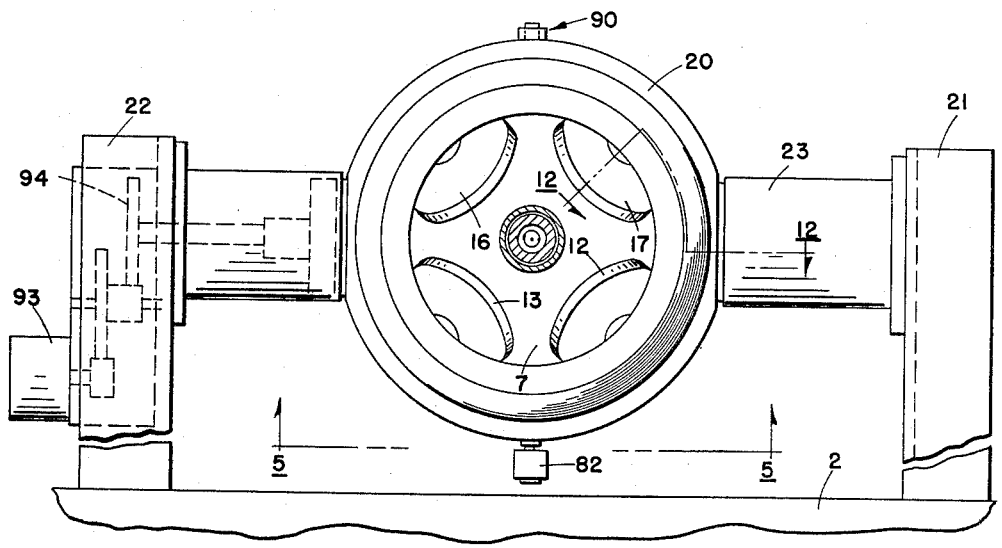
Fig. 4 is a view taken at 4—4 in Fig. 3.
Figure 5:
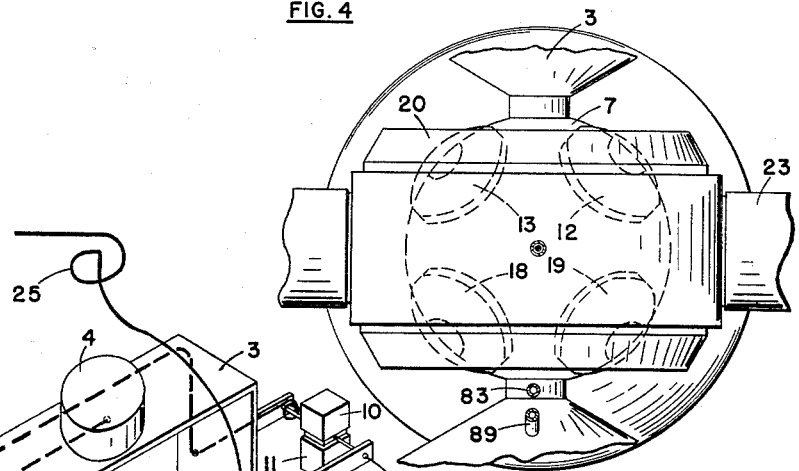
Fig. 5 is a view taken at 5—5 in Fig. 4.
Figure 11:
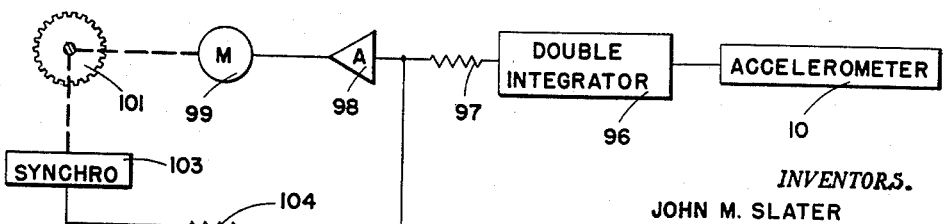
Fig. 11 is a block diagram of typical electrical connections required to control the orientation of the accelerometer platform.

As shown in Fig. 11, accelerometer 10 is connected so that its voltage output, which is proportional to the acceleration sensitive direction thereof, is connected to the input of double integrator 96, thence through summing resistor 97 to the input of amplifier 98 which drives motor 99. Motor 99, as shown in Fig. 2, drives trunnion 9 by means of worm 100 and gear 101. The angular position of trunnion 9 and gear 101 is detected by means of synchro 102 which is driven by means of worm 103. The output of synchro 103 is electrically connected through resistor 104 to the input of amplifier 98. By means of the circuit in Fig. 11, when the sensitive direction of accelerometer 10 in oriented in the direction of travel of the supporting vehicle 2, accelerometer platform 8 turns relative to frame 3 about trunnion 9 through an angle which is proportional to the double integral of the acceleration of supporting vehicle 2 in its direction of travel. By adjusting the scale factor, trunnion 9 is turned through an angle which is exactly equal to the angle through which supporting vehicle 2 has turned along a great circle route relative to the center of the earth.

As shown in Fig. 12, one of air pads 17 is attached through swivel 105 and conduit 106 to channel 81 from whence air is received. Air pad 17 is universally mounted upon swivel 105. Air passing through swivel 105 is retained in the cup-like portion to support ball 7 without friction.

Figure 13:
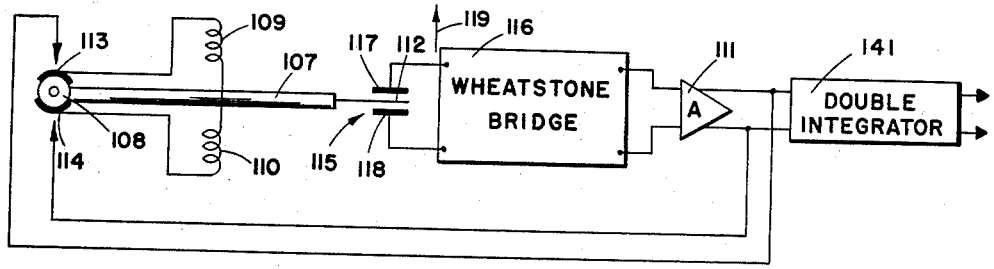
Fig. 13 is a schematic and block diagram of a typical accelerometer and associated circuitry.

A typical accelerometer is shown schematically in Fig. 13. In Fig. 13, mass 107 is pivoted about pivot 108. Electromagnets 109 and 110 are adapted to apply torque to mass 107 about pivot 108 in response to the output of amplifier 111. Electrical current is carried from the output of amplifier 111 to the electromagnets 109 and 110 through slip rings 113 and 114. Any movement of mass 107 about pivot 108 is detected by the unbalance of capacitance pickoff 115 which unbalances Wheatstone bridge 116. Capacitance pickoff 115 has a moving element 112 and two stator elements 117 and 118. Movement of element 112 relative to elements 117 and 118 unbalances Wheatstone bridge 116 to generate a voltage output from amplifier 111 which is proportional to the acceleration upon mass 107 in a direction of arrow 119. Double integrator 141 doubly integrates the voltage output of amplifier 111 to generate a voltage which is proportional to the double integral of the acceleration of mass 107 in the direction of arrow 119. This doubly integrated output may be used to control other devices such as, for example, a programmed autopilot (not shown).

Figure 14:
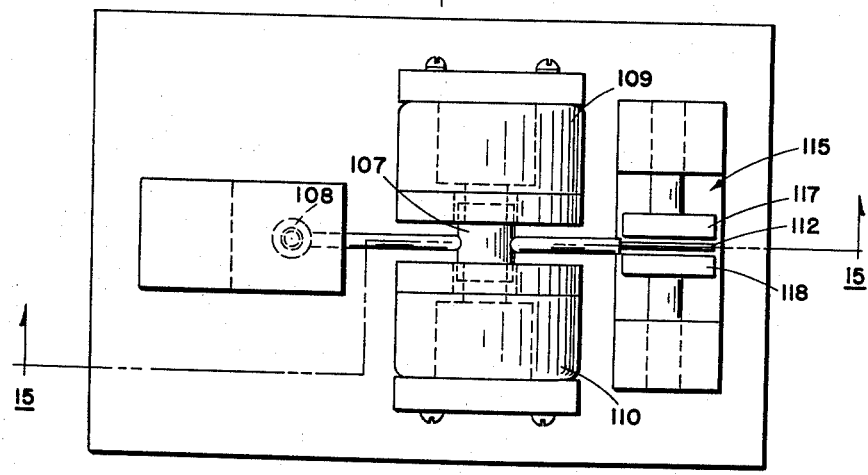
Fig. 14 is a plan view of a typical accelerometer.
Figure 15:
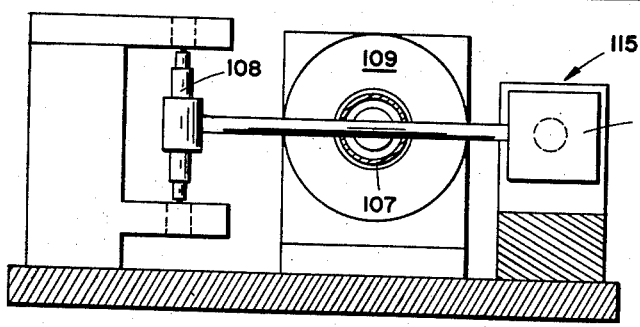
Fig. 15 is a side view of the device shown in Fig. 1.

The mechanical details of a typical device shown in Fig. 13 are shown in Figs. 14 and 15. In Figs. 14 and 15, capacitance pickoff 117 is shown with moving element 112 and stator elements 117 and 118. Mass 107 is sensitive to acceleration in the direction of arrow 119. Mass 107 pivots about pivot 108. Electromagnets 109 and 110 are attached to restore mass 107 to its neutral position. Pivot 108 is a typical low friction pivot which should have as little friction resistance as possible.

During prelaunching alignment, accelerometer 10 is connected through a single integrator and through a circuit which places a constant torque about the output axis of gyroscope 4. Similarly, accelerometer 11 is connected through a single integrator to a circuit which places a constant torque about the output axis of gyroscope 6. Platform 3 is aligned in the direction of travel of its supporting vehicle. The torque placed upon gyroscopes 4 and 6 is just sufficient in magnitude and direction to cause platform 3 to rotate in synchronism with the earth's rotation.

Figure 16:
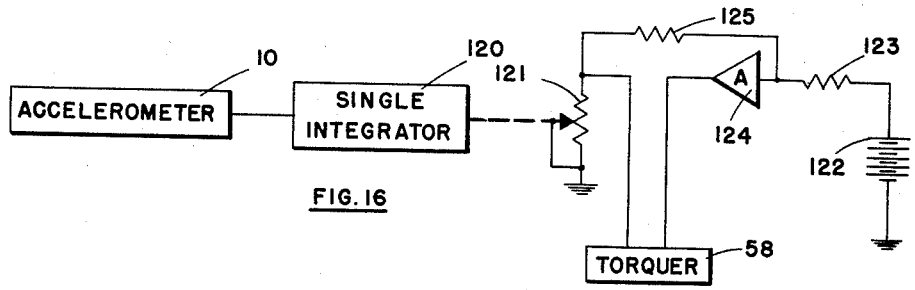
Fig. 16 is an electrical diagram of a typical means for generating constant current to be applied to gyroscope torquer coils prior to motion of the device along its path.

One circuit which may be used to torque gyroscopes 4 and 6 is shown in Fig. 16. In Fig. 16, accelerometer 10 has its output connected to single integrator 120. Single integrator 120 has a mechanical output shaft rotation which is proportional to the single integral of the acceleration of frame 3 in the sensitive direction of accelerometer 10. The mechanical output of single integrator 120 is connected to drive precision potentiometer 121. A standard cell 122 is connected through impedance matching resistor 123 to the input of amplifier 124. Torquer 58 is connected in series with the output of amplifier 124 and potentiometer 121. Resistor 125 is connected between potentiometer 121 and the input to amplifier 124 to maintain current through torquer 58, precisely proportional to the resistance of potentiometer 121 whereby the current through torquer 58 is exactly proportional to the first integral of the acceleration measured by accelerometer 10. A similar circuit may be provided to connect accelerator 11 and the gyroscope torquer on gyroscope 6.

Figure 17:
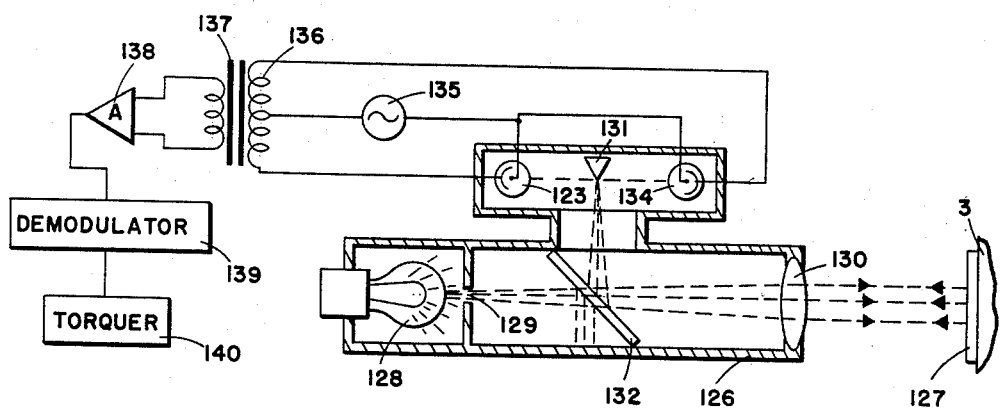
Fig. 17 is a view, partly in section, of a typical autocollimator in combination with an electrical circuit for aligning the platform in its direction of flight.

Autocollimator 126 is utilized to align platform 3 in the proper direction so that accelerometer 10 has its sensitive direction in the direction of flight of supporting vehicle 2. Mirror 127 is attached to frame 3. The axis of autocollimator 126 is oriented by means of theodolite and a light (not shown). In Fig. 17, light source 128 generates light which is focused by means of lenses 129 and 130 upon beam splitter 131. Light passes from source 128 through lens 129, thence to half-silvered mirror 132 through lens 130 to mirror 127 from whence it passes back through lens 130 to half-silvered mirror 132 where part of the light is reflected onto beam splitter 131. When mirror 127 is perpendicular to the axis of autocollimator 126, the light from light source 128 is focused upon the point of beam splitter 131 and light is divided evenly between photoelectric cells 133 and 134. When mirror 127 is tilted at an angle relative to the axis of autocollimator 126, more light is received by one photoelectric cell 133 and 134, while less light is received by the other photoelectric cell 133 and 134, depending upon the direction of the angle through which mirror 127 has turned. Photoelectric cells 133 and 134 are excited by an alternating voltage generated by an alternating voltage source 135. The unbalanced currents generated in photoelectric cells 133 and 134 cause current to flow in winding 136 which has a predominance of one phase or its opposite at a frequency which is equal to the frequency of voltage source 135. The voltage in winding 136 is connected to the input of amplifier 138 through transformer 137. The output of amplifier 138 is connected to the input of demodulator 139 whose output in turn is connected to torquer 140. Torquer 140 is positioned upon gyroscope 5 in the same position as torquer 58 relative to gyroscope 4 as shown in Fig. 7. Hence, when mirror 127 is aligned perpendicular to the axis of autocollimator 126, no voltage is generated by amplifier 138 and no torque is applied to gyroscope 5. Whenever mirror 127 is angularly tilted relative to the axis of autocollimator 126, a torque is generated by torquer 140 which, through gyroscope 5, causes frame 3 to turn and align mirror 127 with the axis of autocollimator 126. The means by which gyroscopes 4, 5 and 6 control the action or motion of frame 3 is explained hereinafter.

After frame 3 is properly aligned, autocollimator 126 is disconnected from torquer 140 and accelerometers 10 and 11 are disconnected from the torquers of gyroscopes 4 and 6, respectively. However, current continues to flow in the torquers of gyroscopes 4 and 6 by virtue of the fixed position of the movable arm of potentiometer 121. These torques upon gyroscopes 4 and 6 cause platform 1 to rotate synchronously with the earth's rotation.

Figure 18:
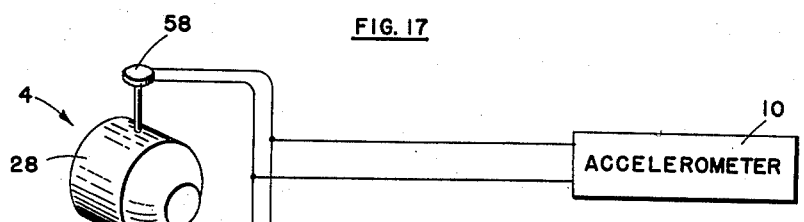
Fig. 18 is a view of a spring torquer upon the output axis of a gyroscope in combination with electrical circuitry for generating a constant torque upon the gyroscope prior to motion of the device along its path.

As shown in Fig. 18 and in Fig. 7, motor 65 is adapted by means of worm 64 and gear 63 to apply a rotation to spring 62 which in turn applies a torque to gyroscope housing 28 about the output axis of gyroscope 4. Torquer 58, which is shown in detail in Fig. 7 and is shown in block in Fig. 18, is adapted to apply a torque to gyroscope housing 28 about its output axis. The electrical output of accelerometer 10, whose sensitive axis is oriented in the direction of flight of supporting aircraft 2, generates a voltage proportional to the acceleration in its sensitive direction. The output of accelerometer 10 is connected to the input of torquer 58 and motor 65 as shown in Fig. 18. Similarly, accelerometer 11 is connected to the input of a pair of torquers (not shown) which are connected to gyroscope 6 by a means similar to that of torquers 58 and 65. Prior to launching, the component of gravity sensed by accelerometer 10 generates a voltage proportional to its sensed acceleration, which voltage is then applied to the input of torquers 58 and 65, causing gyroscope 4 to generate a torque upon frame 3 which causes frame 3 to level itself. At the same time, motor 65 winds spring 62 in a direction to cause spring 62 to supply all of the torque to gyroscope 4. Similarly, accelerometer 11 causes gyroscope 6 to generate a torque about an axis perpendicular to the torque generated by gyroscope 4 to completely stabilize platform 1 in synchronism with the earth's rotation. After platform 1 has been synchronized with the earth's rotation, accelerometers 10 and 11 are disconnected from the spring torquers of gyroscopes 4 and 6.

After platform 1 has been aligned by means of connections between accelerometers 10 and 11 and gyroscopes 4 and 6 as heretofore described, the connections are broken and after autocollimator 126 has caused gyroscope 5 to align platform 1 in its initial direction of flight, autocollimator 126 is disconnected.

Accelerometer 10 is then connected as shown in Fig. 11. Gear 101 is caused to turn in a direction to cause platform 8 to remain locally level by causing it to turn forward in the direction of flight by an angle which is proportional to the double integral of the acceleration measured in that direction. The electrical output of accelerometers 10 and 11 may be utilized on auxiliary devices within airframe 2. The electrical output of accelerometers 10 and 11 at all times is proportional to the acceleration in their respective sensitive directions. By singly integrating the electrical output, their velocity may be obtained and by doubly integrating their output, the distance through which they have traveled may be obtained. This measure of distance may be used to program or pre-program the flight of a pilotless aircraft. The acceleration and velocity readings can be utilized to control an autopilot (not shown). In a manned aircraft, these readings may be displayed on suitable dials (not shown). Since this guidance system is primarily adapted for travel from one point to another upon the surface of the earth along a great circle route, that portion of the great circle which has been traveled is also a measure of the angle relative to the center of the earth through which the supporting vehicle (not shown) has turned.

Similarly, the measure of velocity is in reality a measure of the angular velocity of aircraft 2 relative to the center of the earth in the plane of the great circle along which aircraft 2 is flying. By the use of suitable scale proportional to the radius of the earth, this angular velocity is measured in linear velocity over the surface of the earth.

Hence, assuming no disturbing torques placed upon platform 1 because of the air-bearing support between ball 7 and air pads 12 to 19, accelerometers 10 and 11 are maintained locally horizontal and read a measure of acceleration, velocity, and distance in the direction of travel and perpendicular thereto. When a disturbing torque is placed upon frame 3, it may have one or more of three orthogonal components. Consider only one of these components, i.e. the component which affects gyroscope 4, namely the component of torque having vector direction perpendicular to the plane of the drawing of Fig. 2. The rotor of gyroscope 4 is caused to precess about its output axis. The precession is detected by means of pickoff 60 and 61 which is in turn connected through an amplifier to airjet torquer 66 which emits a blast of air in a direction to generate a torque opposite to the torque applied to frame 3. A schematic of this connection is shown in Fig. 19. In the event that frame 3 tilts about an axis perpendicular to the plane of drawing of Fig. 2, hereinafter called the pitch axis, the relative motion between frame 3 and gimbal 20 is detected by means of pickoff 90 which, in turn, is connected through Wheatstone bridge 91 and amplifier 92 to motor 93, as shown in Fig. 10. Motor 93 drives gear train 94 to cause gimbal 20 to follow pickoff 90, thereby preventing mechanical interference between frame 3 and gimbal 20.

There is thus provided a highly accurate means for navigating an aircraft from one point to another. This invention is also applicable to land or sea-going vehicles where it is desirable to obviate the necessity for exerting an external control over the craft after it is started on its course. This increased accuracy results from the cooperation of many new elements in the device, among which are the means for torquing gyroscopes 4, 5 and 6 with a torquer which cause frame 3 to be synchronized with the rotation of the earth, means for doubly integrating the acceleration in the sensitive direction of eccelerometer 10 for driving platform 8 angularly forward in the direction of motion by an angle which is proportional to the double integral of the measured acceleration, means for applying a torque to plaform 3 in response to the output of precision pickoffs of the gyroscope, a simply-supported low friction ball mount, and a close pitch axis follow-up means for causing gimbal 20 to avoid interference with platform 3. By combining all or a significant number of the features incorporated in this invention, an accuracy of an order ten or more times as great as that achieved by previously known guidance systems may be obtained.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In a guidance system, a stable platform comprising a rigid frame having three degrees of angular freedom, a plurality of gyroscopes each having an input and output axis attached to said frame, means for applying constant torques to the output axes of said gyroscopes, means for detecting the precession of said gyroscopes about their output axes and torquing means connected to be responsive to said precession of said gyroscopes and attached to said frame to apply torque to cause angular movement of said frame whereby said frame experiences rotations at a constant predetermined rate.

2. In a guidance system, a stabilized platform comprising a rigid frame having three degrees of angular freedom, three gyroscopes attached to said frame with their input axes orthogonal and having angular freedom of precession relative to said frame about their output axes, means for applying constant torques to said gyroscopes between said frame and said gyroscopes about the output axes of said gyroscopes whereby said frame experiences rotation at a constant predetermined rate.

3. In a guidance system a stabilized platform comprising a rigid frame mounted to have three degrees of angular freedom, three gyroscopes attached to said frame, each said gyroscope having an input, an output, and a spin axis, said input axes being orthogonal, said gyroscopes having freedom to precess relative to said frame about only their output axes, means for applying constant torques to said gyroscopes about their output axes whereby said frame experiences rotation at a constant predetermined rate due to precession of said gyroscopes about their input axes.

4. In a guidance apparatus a rigid platform having three degrees of angular freedom, a plurality of gyroscopes having output axes and mounted on said platform in a configuration to stabilize it in space, and means for applying constant torques to said gyroscopes about the output axes thereof to cause precession of said rigid platform about a predetermined axis in space.

5. Navigational reference means for guiding a body over the surface of the earth along a predetermined path comprising constant torqued gyroscopically stabilized means connected to maintain itself level relative to the beginning of said path, frame means mounted for one degree of angular rotation about an axis normal to said path, accelerometer means mounted upon said frame for sensing accelerations of said body along and normal to said path, and means connected between said accelerometer means and said frame to cause said frame to maintain itself in a local level attitude independently of said body.

6. A gyroscopically stabilized navigational reference device for a body moving over the surface of the earth between two points thereon along a predetermined path comprising a gyroscopically stabilized platform maintained level relative to the starting point of said path, a frame having one degree of angular freedom relative to said stabilized platform about an axis normal to said path and to a line joining said platform and the center of the earth, said frame being maintained locally level by causing it to rotate about said axis through an angle proportional to the angle through which said platform has turned relative to the center of the earth since leaving the starting point of said path, two accelerometers with sensitive axes normal to each other and normal to said line joining said platform and the center of the earth and oriented so that the axis of one said accelerometer is normal to said path, and means connected between said accelerometer whose axis is parallel to said path and said frame for maintaining said frame locally level whereby an electrical output may be obtained from said accelerometers proportional to instantaneous accelerations, instantaneous velocity, and the distance along said path said body has traveled.

7. Means for rotating a body in space at a predetermined uniform angular velocity comprising three gyroscopes with their input axes orthogonally oriented supported on said body for one degree of angular freedom about their output axes and being rigidly connected to said body about their input axes, means for applying constant torques to said gyroscopes about their output axes to cause said body to rotate by virtue of the precession of said gyroscopes about their input axes, means for detecting precession of said gyroscopes about their output axes, torquing means oriented upon said body to apply corrective torques to said body in the senses necessary to relieve the precession of said gyroscopes about their output axes, and servo means electrically connected between said detecting means and said torquing means whereby said body rotates continuously in space at a predetermined uniform angular velocity.

8. A device as recited in claim 7 in which said means for applying constant torques to said gyroscopes comprises mechanical springs.

9. A device as recited in claim 7 in which said means for applying constant torques to said gyroscopes comprises preadjustable elastic torsion means.

10. Means for rotating a body in space at a predetermined angular velocity comprising means for universally supporting said body without appreciable frictional resistance to rotative movement, means for supporting three gyroscopes on said body with their input axes in nonparallel orientation with freedom for low friction rotation relative to said body about their output axes, means for applying torques of predetermined magnitude to said gyroscopes about their output axes whereby said body rotates at a predetermined angular velocity in space by virtue of the precession of said gyroscopes about their input axes.

11. Means for precisely controlling the angular rate of rotation of a body in space comprising means for universally supporting said body without appreciable frictional resistance to rotative movement, means for supporting three gyroscopes on said body with their input axes in non-parallel orientation with freedom for low friction about their output axes, means for applying torques of predetermined magnitude to said gyroscopes about their output axes, a plurality of fluid jet means arranged in opposed pairs to apply reaction torques to said body about axes corresponding to the input axes of said gyroscopes, means for detecting precession of said gyroscopes about their output axes and servo means connected between said detecting means and said jet means to control the amount of torque exerted by said jet means in response to precession of said gyroscopes about their output axes.

12. Inertial means adapted to guide a missile over the surface of the earth along a great circle course comprising a gyroscopically stabilized platform, a pair of accelerometers mounted for one degree of angular freedom relative to said platform, means for torquing gyroscopes of said platform about their output axes to cause by virtue of their precession about their input axes a rotating component of said platform about an axis parallel to the earth's axis, integrating means connected to said accelerometers to compute the double integral with respect to time of acceleration of each said accelerometer, and means connected to said double integrating means to be responsive to the double integral of the acceleration in the direction of flight of said missile and connected between said accelerometer and said platform to be operable on said accelerometers to produce a forward rotation of said accelerometers at a rate equal to the angular velocity of said missile with respect to the center of the earth.

13. In a guidance system, a stabilized platform comprising three gyroscopes disposed with their input axes orthogonal, frame means connected to hold said gyroscopes in rigid relationship while allowing freedom of rotation of said gyroscopes about their output axes, accelerometers mounted on said frame means for freedom for rotative movement about a horizontal line normal to the direction of motion of said system, torquing means connected between said gyroscope and said frame means to apply constant torques to said gyroscopes about their output axes to cause precession of said platform in space at the same rate as and parallel to the earth's rotation, detecting means connected between said gyroscopes and said frame means to detect precession of said gyroscopes about their output axes with respect to said frame means, torquing means connected to said detecting means and mechanically attached to said frame to apply torque thereto in the sense necessary to reduce to zero said precession about the output axes of said gyroscopes, and driving means connected between said accelerometers and said frame means to drive said accelerometers angularly forward in the direction of motion of said system at an angular velocity proportional to the first integral of the acceleration of said body in the direction of motion of said system whereby said accelerometers are accurately maintained in level attitude despite rotation of the earth and travel of said body over the earth.

14. A navigational reference device comprising a plurality of gyroscopes, platform means connected to support said gyroscopes, bearing means connected to mount said gyroscopes to be free to move about their output axes with respect to said platform, low friction means connected to support said platform in said body with freedom for angular movement in any direction, means for detecting relative angular movement connected to each said gyroscope about its output axis, torquing means connected to be responsive to said detecting means attached to said platform in the senses necessary to eliminate said angular movements about said output axes, means for applying constant torques about the output axes of said gyroscopes to cause them to precess about their input axes to cause rotation of said platform about an axis parallel to the earth's polar axis at the same rate and direction as the earth's rotation, means for detecting accelerations of said body in directions parallel to said path and normal to a plane containing said path and the center of the earth, means for doubly integrating with respect to time the acceleration detected by said acceleration detecting means, support means connected between said acceleration detecting means and said platform to support said acceleration detecting means with freedom for angular movement about an axis normal to said predetermined path and a line connecting the center of the earth with said platform, and drive means connected between said support means and said platform to cause relative angular motion of said acceleration detecting means relative to said platform by an angle proportional to the doubly integrated acceleration of said body in the direction necessary to keep said acceleration detecting means level.

15. In a navigational reference device, a stabilized element in said device comprising a spherical ball supporting said element upon a diameter thereof, a support member somewhat larger than said ball fitted with a fluid supply system and adapted to be mounted in said device, a plurality of fluid bearing pads each with a bearing surface conforming to said ball, means for pivotally mounting said fluid bearing pads on said support member to communicate with said fluid supply system, whereby said stabilized element is supported in complete freedom for angular movement with respect to said device about at least one axis and limited freedom about other axes without appreciable friction.

16. In a navigational reference device having a stabilized reference element, means for mounting said element comprising a spherical ball fixed to said stabilized element along a diameter of said ball, a cylindrical casing having tubular supports and larger in diameter than said ball, a plurality of bearing plates conforming to the surface of said ball and pivotally mounted on the inner surface of said casing, and means for introducing air under pressure to the space between said plates and said ball to thereby float said ball and stabilized element on a film of air while allowing it complete angular freedom about one axis and limited angular freedom about other axes.

17. Means for supporting an object for free angular movement relative to a base, while restraining translation, comprising a ball fixed to said object, eight bearing pads attached to said base upon each octant of said ball and of shape conforming to the surface of said ball, and means for introducing air or liquid between said pads and ball to float said ball.

18. In combination a spherical member, eight pads of shape conforming to that of said spherical member spatially distributed among the eight octants of said member with one said pad to each said octant, means for pivotally supporting said pads against said member, and means for introducing fluid between said pads and said member.

19. A navigational reference device for guiding a body over the surface of the earth along a predetermined path comprising acceleration sensing means for sensing accelerations of said body in the direction of, and normal to, said path; gyroscopically stabilized means connected to hold said acceleration sensing means in level attitude at all positions along said path independently of said body including at least three gyroscopes having their input axes orthogonal to each other and having their input axes rigidly attached to said stabilized means; and torque means connected to the output axes of said gyroscopes to apply a constant torque thereto.

20. Navigational reference means for guiding a body over the surface of the earth along a predetermined path comprising two accelerometers with their sensitive axes normal to each other; a frame; three gyroscopes rigidly mounted on said frame with their input axes orthogonally disposed with freedom for rotative movement about their output axes; torquing means attached to said frame; sensing means positioned to detect precession of said gyroscopes about their output axes; servo means connected between said sensing means and said torquing means; said torquing means being oriented to supply torques to said frame in response to said sensing means to prevent precession of said gyroscopes about their output axes relative to said frame; means connected to supply constant torques between said gyroscopes and said frame about the output axes of said gyroscopes to cause rotation of said frame at a constant rate about an axis parallel to the earth's polar axis due to precession of said gyroscopes about their input axes; low friction means between said frame and said body with three degrees of angular freedom; means for mechanically connecting said accelerometers to said frame to maintain the sensitive axes of said accelerometers normal to a line joining them and the center of the earth and oriented so that one said axis is a level axis normal to said path, said supporting means for said accelerometers having freedom for rotative movement about said level axis; double integrating means and rotative means connected between said frame and said means for supporting said accelerometers to rotate said means for supporting said accelerometers about said level axis through an angle proportional to the second time integral of the acceleration of said body in the direction of said path; and double integrating means connected between the electrical output of said accelerometer whose sensitive axis is in the direction of motion of said body and said rotative means whereby said accelerometers are kept locally earth level at all times despite rotation of the earth and travel of said body along said path.

21. In a guidance apparatus, a rigid platform having three degrees of angular freedom; a plurality of gyroscopes mounted on said platform to stabilize it angularly in space, each said gyroscope having an input axis which is rigidly connected to said platform and an output axis which is free to rotate relative to said platform; and means for applying constant torques to the output axes of said gyroscopes to cause precession of said gyroscopes about their input axes whereby said rigid platform is rotated at a predetermined rate about a predetermined axis in space.

22. A navigational reference system comprising an assembly of gyroscopes, means for maintaining a fixed angular orientation of said assembly relative to the earth, an acceleration sensing device mounted to said assembly with a single degree of pivotal motion relative thereto, and means responsive to said sensing device for effecting pivotal motion thereof relative to said assembly.

23. A stable reference system comprising an assembly of gyroscopes adapted to move in a path lying in a predetermined plane containing the center of the earth, means for directly torquing at least one of said gyroscopes to effect rotation of said assembly about an axis parallel to the axis of rotation of the earth, means carried by said assembly for sensing acceleration along said path, and means responsive to said sensing means for rotating said assembly about an axis normal to said plane.

24. A three-axis stable platform comprising a stabilized frame, a spherical member mounted centrally of and wholly within said frame, a support mounting said member for universal rotational motion, a base, means pivotally mounting said support to said base, and means responsive to relative rotational motion of said frame and support for rotating said support relative to said base.

25. In an inertial navigation system, a stable platform comprising an assembly of gyroscopes with reference axes disposed so as to provide angular references about three orthogonal space axes, means for torquing at least one of the gyroscopes to cause precession of the gyroscope assembly about an axis parallel to the earth's axis in synchronism with earth rotation, a pair of integrating accelerometers with mutually orthogonal sensing axes, gimbal means for supporting the pair of accelerometers relative to the gyroscope assembly for rotation about a single normally horizontal axis, angular drive means connected with said gimbal means, and means for operating said drive means at an angular rate such as to tilt the accelerometers about said single axis at substantially the same rate as the assembly is moved around the center of the earth.

References Cited in the file of this patent

UNITED STATES PATENTS

| | | |
|---|---|---|
| 1,086,242 | Sweeny | Feb. 3, 1914 |
| 1,930,082 | Borkow | Oct. 10, 1933 |
| 1,950,517 | Rawlings | Mar. 13, 1934 |
| 2,109,283 | Boykow | Feb. 23, 1938 |
| 2,263,232 | Bolster | Nov. 18, 1941 |
| 2,348,928 | Sampatacos | May 16, 1944 |
| 2,414,291 | Evans | Jan. 14, 1947 |
| 2,591,697 | Hays | Apr. 8, 1952 |
| 2,606,448 | Norden | Aug. 12, 1952 |
| 2,617,695 | Tanscher | Nov. 11, 1952 |
| 2,637,914 | Rawlings | May 12, 1953 |
| 2,752,792 | Draper | July 3, 1956 |
| 2,762,123 | Schultz | Sept. 11, 1956 |